United States Patent
Borsum et al.

(10) Patent No.: US 10,057,626 B2
(45) Date of Patent: Aug. 21, 2018

(54) METHOD FOR DISPLAYING A VIDEO AND APPARATUS FOR DISPLAYING A VIDEO

(71) Applicant: THOMSON LICENSING, Issy les Moulineaux (FR)

(72) Inventors: Malte Borsum, Hannover (DE); Axel Kochale, Springe (DE)

(73) Assignee: Thomson Licensing, Issy les Moulineaux (FR)

( * ) Notice: Subject to any disclaimer, the term of this patent is extended or adjusted under 35 U.S.C. 154(b) by 0 days.

(21) Appl. No.: 14/916,422

(22) PCT Filed: Aug. 15, 2014

(86) PCT No.: PCT/EP2014/067486
§ 371 (c)(1),
(2) Date: Mar. 3, 2016

(87) PCT Pub. No.: WO2015/032605
PCT Pub. Date: Mar. 12, 2015

(65) Prior Publication Data
US 2016/0219326 A1    Jul. 28, 2016

(30) Foreign Application Priority Data
Sep. 3, 2013 (EP) .................................. 13306197

(51) Int. Cl.
*G06F 3/00* (2006.01)
*G06F 13/00* (2006.01)
(Continued)

(52) U.S. Cl.
CPC ..... *H04N 21/4312* (2013.01); *H04N 21/4363* (2013.01); *H04N 21/4402* (2013.01);
(Continued)

(58) Field of Classification Search
CPC ......... H04N 21/4312; H04N 21/44008; H04N 21/4402; H04N 21/440263
See application file for complete search history.

(56) References Cited

U.S. PATENT DOCUMENTS 7,065,140 B1 * 6/2006 Ritter ..................... H04N 7/181
348/207.1
8,102,432 B2    1/2012 Knee
(Continued)

FOREIGN PATENT DOCUMENTS

EP    0661627    7/1995

OTHER PUBLICATIONS

Deselaers et al "Pan, zoom, scan—Time-coherent, trained automatic video cropping", 2008 IEEE Conference on Computer Vision and Pattern Recognition, Anchorage, Alaska, USA, Jun. 23, 2008, pp. 1-8.
(Continued)

*Primary Examiner* — Joshua Taylor
(74) *Attorney, Agent, or Firm* — Tutunjian & Bitetto, P.C.

(57) ABSTRACT

Television broadcast standards are continuously improved and new standards are introduced, often with increased resolution. Many users keep their television set that cannot take advantage of the improvements. However, in a case where a higher resolution video signal is available, additional services can be provided to the users of standard resolution television sets. A method for displaying a video comprises steps of enabling a user to define (71) first view settings, applying (72) the first view settings to a first view of a first video scene, determining (73) a first camera corresponding to the first view, storing (74) the first view settings, after a scene change towards a new scene detecting
(Continued)

(76) that the new scene corresponds to the first view, and automatically applying (78) the first view settings for displaying the new scene.

15 Claims, 4 Drawing Sheets

(51) Int. Cl.
*H04N 5/445* (2011.01)
*H04N 21/431* (2011.01)
*H04N 21/4363* (2011.01)
*H04N 21/4402* (2011.01)
*H04N 21/44* (2011.01)
*H04N 21/61* (2011.01)

(52) U.S. Cl.
CPC ........... *H04N 21/44008* (2013.01); *H04N 21/440272* (2013.01); *H04N 21/6125* (2013.01)

(56) References Cited

U.S. PATENT DOCUMENTS

| 8,373,802 | B1 | 2/2013 | Gross et al. |
|---|---|---|---|
| 2001/0019365 | A1 | 9/2001 | Kim et al. |
| 2006/0280360 | A1 | 12/2006 | Holub |
| 2006/0280364 | A1 | 12/2006 | Ma et al. |
| 2007/0139405 | A1* | 6/2007 | Marcinkiewicz .... G09G 3/2003 345/207 |
| 2009/0002567 | A1* | 1/2009 | Maruyama ............ G11B 27/28 348/700 |
| 2009/0251594 | A1 | 10/2009 | Hua et al. |
| 2009/0300538 | A1 | 12/2009 | Okamura et al. |
| 2009/0300692 | A1* | 12/2009 | Mavlankar ..... H04N 21/234318 725/94 |
| 2010/0077441 | A1* | 3/2010 | Thomas ................ G06F 3/1415 725/133 |
| 2011/0069224 | A1 | 3/2011 | Gross et al. |
| 2012/0089626 | A1* | 4/2012 | Goranson ......... G06F 17/30817 707/756 |
| 2013/0250121 | A1 | 9/2013 | Piran et al. |

OTHER PUBLICATIONS

Chamaret et al., "Video retargeting for stereoscopic content under 3D viewing constraints", Proceedings of the SPIE—The International Society for Optical Engineering, vol. 8288, 2012, pp. 1-12.
Lavigne et al., "Automatic video zooming for sport team video broadcasting on smart phones", 2010 International Conference on Computer Vision, Theory and Applications, Angers, France, May 17, 2010, pp. 1-7.
Cavalcanti et al., "Combining Multiple Image Features to Guide Automatic Portrait Cropping for Rendering Different Aspect Ratios", Proceedings of the Sixth International Conference on Signal-Image Technology & Internet-Based Systems, Kuala Lumpur, Malaysia, Dec. 15, 2010, pp. 66-73.

* cited by examiner a) b)

METHOD FOR DISPLAYING A VIDEO AND APPARATUS FOR DISPLAYING A VIDEO

This application claims the benefit, under 35 U.S.C. § 365 of International Application PCT/EP2014/067486, filed Aug. 15, 2014, which was published in accordance with PCT Article 21(2) on Mar. 12, 2015 in English and which claims the benefit of European patent application No. 13306197.8, filed Sep. 3, 2013.

FIELD OF THE INVENTION

This invention relates to a method for displaying a video, or modifying or preparing a video for being displayed, and an apparatus for displaying a video or modifying or preparing a video for being displayed.

BACKGROUND

In regular intervals of several years, television broadcast standards are improved and new standards are publicly introduced. Often, the new standard provides for an increased spatial and/or temporal resolution. However, many users keep their television set that is suitable for the commonly used television broadcasting format, and only buy a new set-top box (STB) if necessary. Thus, these users may continue watching television, but due to the given resolution of their television sets only at their traditional standard resolution. Thus, they cannot take any advantage of the improved technology. Usually, the full image is downscaled. A commonly used television broadcasting format is one for which typical customers/viewers have television devices at home. Higher resolution means that the production (and the transmission) is capable of providing more detail than the customer device is able to show. E.g., at the moment a commonly used television broadcasting format would be HD (1920×1080 pixels), while an advanced higher resolution format would be 4K (3840×2160 pixels). Therefore, at the moment there is a need to process a 4K stream so that it can be shown on standard HD screens. However, the same situation will reappear with every newly introduced format.

SUMMARY OF THE INVENTION

A problem to be solved by the invention is to provide additional services to the users of television sets with conventional standard resolution in a case where a higher resolution video signal is available. The present arrangement provides a solution for at least this problem. Further, the invention may solve problems that may result from individual interactivity, especially individual interactive view selection: Each time a broadcasted view changes the camera or a scene cut occurs, the currently used individualized view will conventionally be maintained, and therefore is improper.

A first embodiment of a method for modifying a video for display is disclosed in claim 1. An apparatus for preparing or modifying the displaying of a video according to a third embodiment is disclosed in claim 10. Further embodiments are disclosed in the dependent claims.

In one aspect, the invention relates to a computer readable medium having executable instructions to cause a computer to perform the method of one of the claims 1-9.

According to a first embodiment, a method for displaying a video or modifying or preparing a video for being displayed comprises steps of enabling a user to define first view settings, applying the first view settings to a first view of a first video scene, determining a first camera corresponding to the first view, storing the first view settings, detecting after a scene change towards a new scene if the new scene corresponds to the first view, and upon detecting that the new scene corresponds to the first view, automatically applying the first view settings for displaying the new scene. Otherwise, if the new scene does not correspond to the first view, the first view settings are not applied for displaying the new scene.

According to a second embodiment, a method for displaying a video or modifying or preparing a video for being displayed comprises steps of enabling a user to define first view settings, applying the first view settings to a first view of a first video scene, determining a first camera corresponding to the first view, storing the first view settings, detecting a first scene change, detecting that the scene after the first scene change corresponds to a second view different from the first view, enabling a user to define second view settings, applying the second view settings to the second view of the second video scene, storing the second view settings, and determining a second camera corresponding to the second view.

The method according to the second embodiment may further comprise steps of detecting a second scene change, detecting that the scene after the second scene change corresponds to the first view, retrieving the stored first view settings, and automatically applying the first view settings for displaying the scene after the second scene change.

The method and apparatus may also be supported by pre-produced metadata. Metadata for several different proposed views, individually for different display device types, may be provided with the video data stream or from an external source (e.g. via Internet). The metadata may also indicate scene changes and/or identify different cameras or views. The usage of the metadata may be offered as an option to the viewer, who may still modify views individually.

An advantage of the present arrangement is that interactivity is made easier and more convenient for the user, particularly with respect to interactive view selection. A user can define preferred personal view settings individually for each detected camera view.

Advantageous embodiments of the invention are disclosed in the dependent claims, the following description and the figures.

BRIEF DESCRIPTION OF THE DRAWINGS

Exemplary embodiments of the invention are described with reference to the accompanying drawings, which show in FIG. 1 an overview of a typical AV production and transmission system, FIG. 2 the principle of user-defined view generation, FIG. 3 exemplary different possible user views, FIG. 4 another set of exemplary different possible user views, FIG. 5 images from a produced video sequence, FIG. 6 an exemplary device according to an embodiment of the invention, and FIG. 7 a flow-chart of the method according to an embodiment of the invention.

DETAILED DESCRIPTION OF THE INVENTION

Figure 1:
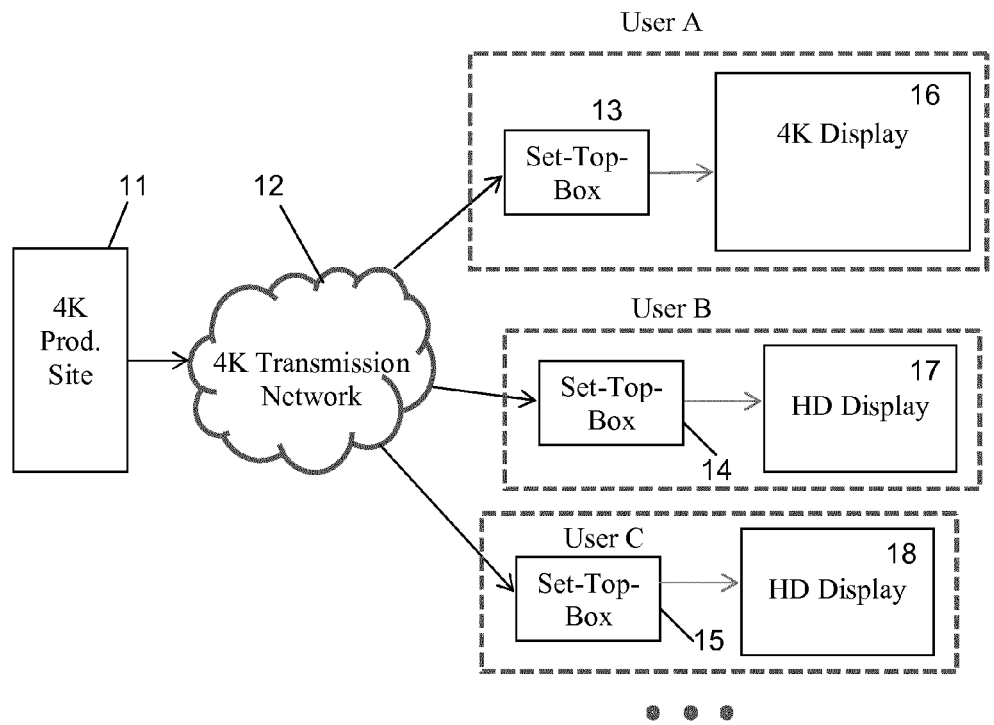

FIG. 1 shows an overview of a typical audio-visual (AV) production and transmission system. At the production site 11, one standard program view is produced in high resolution, e.g. 4K, and transmitted via some kind of transmission network 12 to end users. All of these users may have the same kind of set-top boxes 13-15 (or receivers, more generally), but different displays 16-18. As user A has a matching display 16, so that the user A can view the original content in full resolution (e.g. 4K). For other users B and C, who have lower resolution displays 17-18, their respective set-top box 14-15 (or receivers) working according to the invention can convert the signal. As a result, the lower resolution displays 17-18 display the content according to the individually selected view, but in their respective resolution (e.g. HD).

Figure 2:
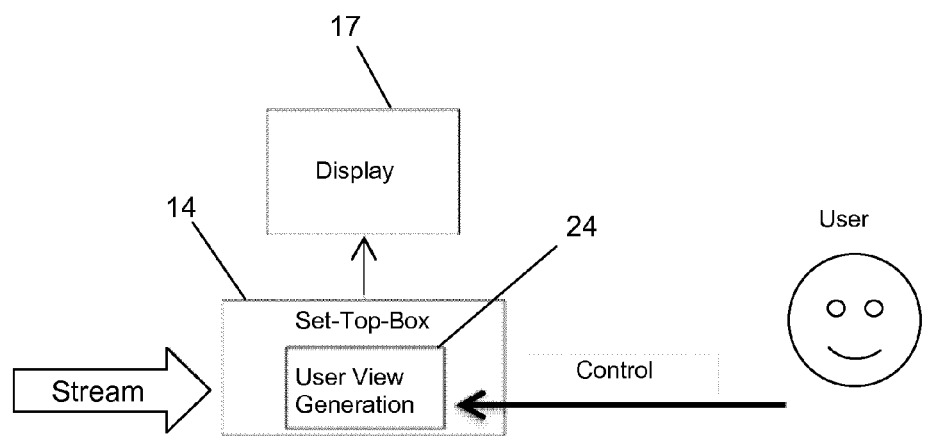

In FIG. 2, a user's set-top box 14 receives the standard video stream, and a User View Generation unit 24 generates a User View for the connected display 17 according to control information received from the user through a user interface. Thus, the user can control the User View generation process.

Figure 3:
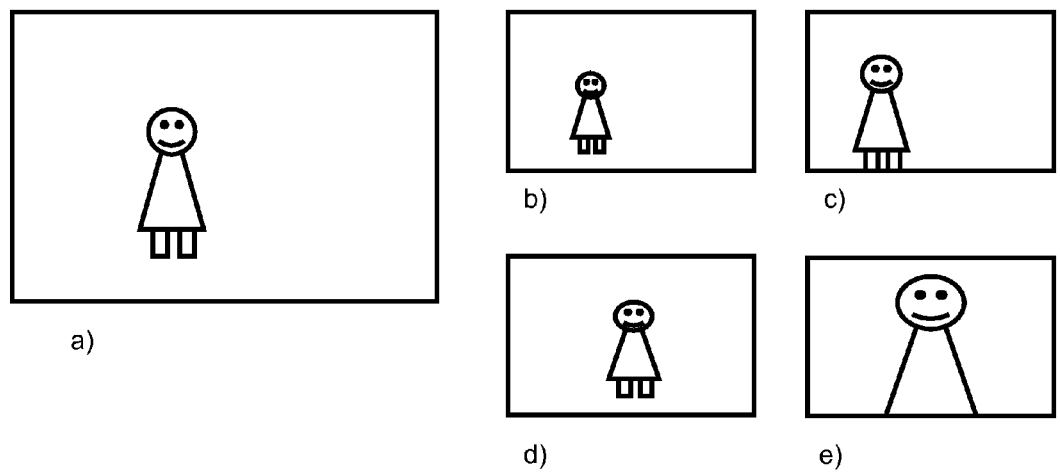

FIG. 3 shows different possible user views. FIG. 3 a) shows the default view with higher resolution, wherein the full size video is shown. E.g. a 4K image is shown on a 4K display. FIG. 3 b)-e) show different ways how a user defined view may look like at a lower resolution.

The video in FIG. 3 b) is just downsampled, i.e. the full video is shown in lower spatial resolution, such as High Definition (HD) or Standard Definition (SD). The video in FIG. 3 c) is "zoomed centered", i.e. zoomed towards the center of the display. The spatial resolution is similar or equal to the spatial resolution of the input video, but edges (upper, lower, left and right edge) of the video are cropped and not displayed. In the "zoomed centered" mode, the center of the image is maintained and substantially the same amount of edges on the left and the right side, and on upper and lower side respectively, are cropped (assuming constant aspect ratio).

The video in FIG. 3 d) is zoomed only a little, and panned for centering outside the original center of the video. The panning may move the view on any region of interest, e.g. a person or an important object. Panning means that different amount of edges on the left and the right side (and/or on the upper and lower side, respectively) are cropped, so that the center of the image is shifted. The view in FIG. 3 e) is zoomed very far, so that the spatial resolution may be higher than in the input video (as obtained e.g. by spatial interpolation), and panned on the person (or on important object). The panning may be done interactively or by using metadata for pre-produced proposed view settings. Proposed view settings may be created in a studio, applicable e.g. for SD displays with a particular given resolution lower than provided by the currently used format.

Figure 4:
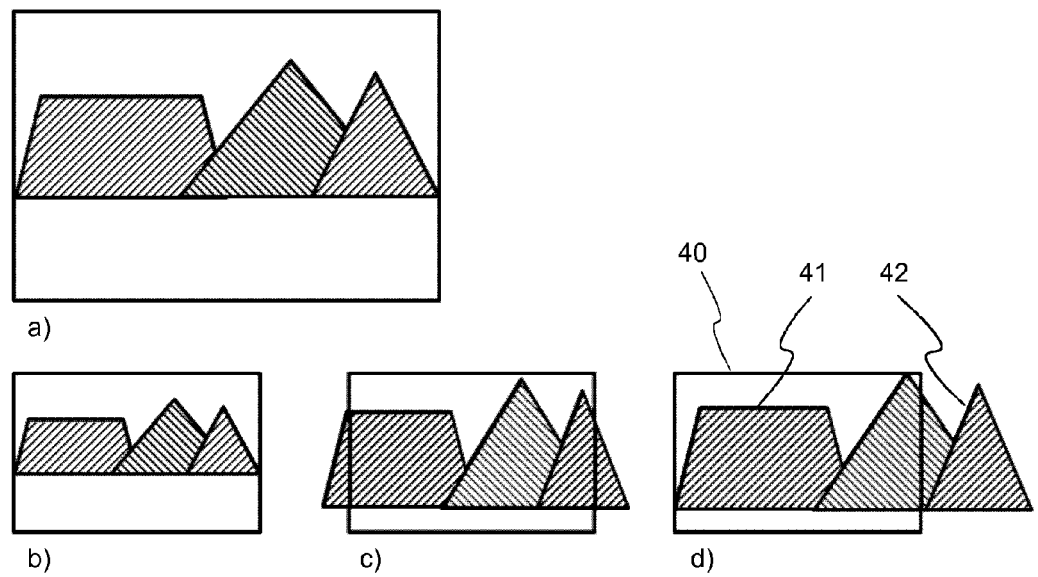

Another example of user-defined views is shown in FIG. 4. FIG. 4 a) shows the input video, which is the default view at high resolution for user A. FIG. 4 b)-d) show different ways how a user-defined view may look like at a lower spatial resolution. While the video in FIG. 4 b) is just downsampled, so that the full video is visible, the video in FIG. 4 c) is zoomed centered and the one in FIG. 4 d) is zoomed and panned, in order to move the view on an important object 41. Thus, it may happen that other objects 42 are outside the visible area 40 and thus not displayed any more due to the cropping. The zoomed and panned view is particularly useful if the cropped portion of the video outside the visible area does not show any objects of interest.

Figure 5:
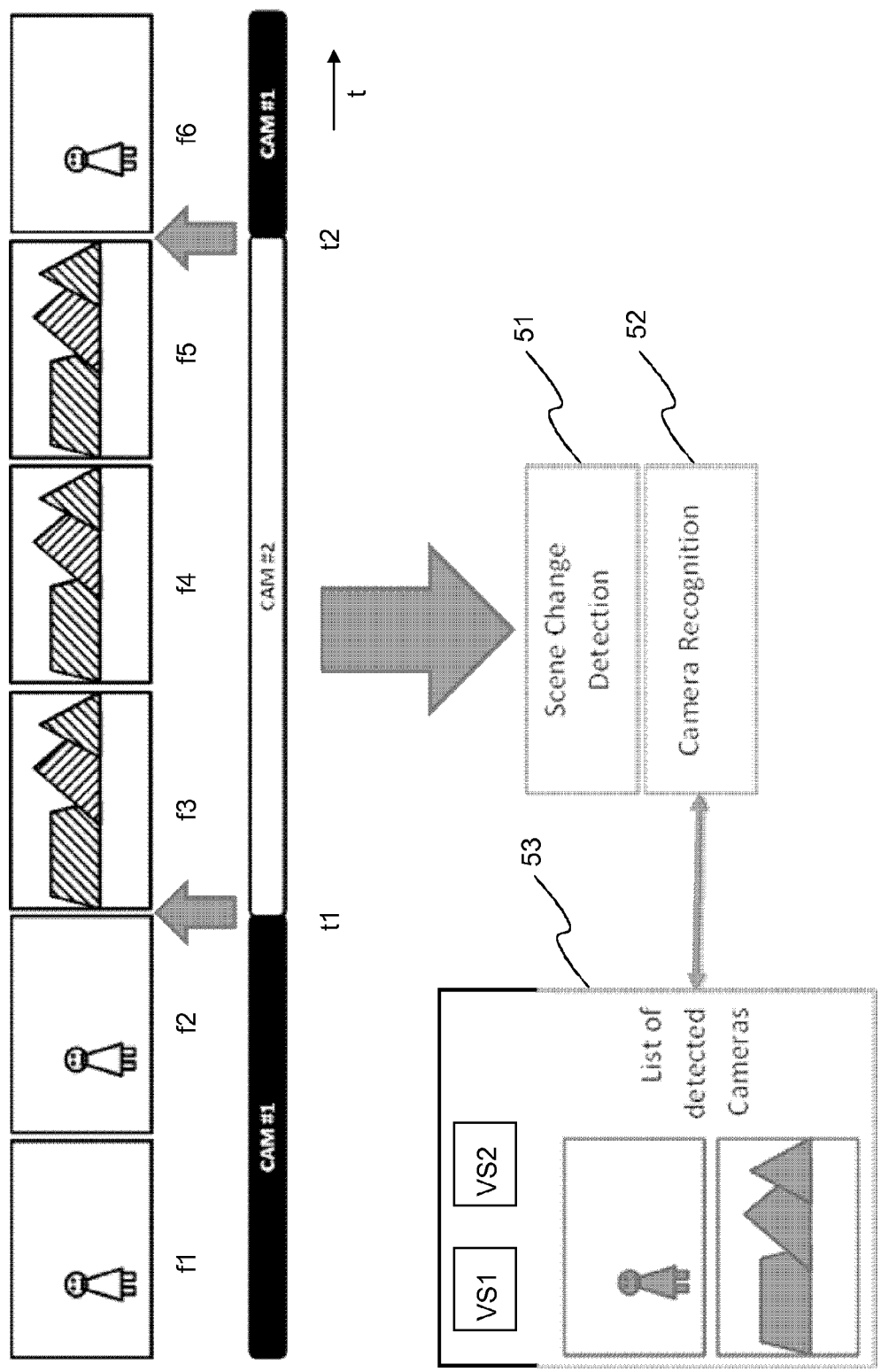

FIG. 5 shows some images f1-f6 from a produced video sequence in temporal order. This sequence is input to the set-top box according to the invention. The sequence begins with a first view f1-f2 taken from a first camera CAM#1. At some point in time t1, the view changes from the first camera CAM#1 to a second view from a different second camera CAM#2, and images f3-f5 of the second view are displayed. Somewhat later, at a time t2, the view switches back to the first camera CAM#1, and further pictures f6 of the first view are displayed.

In the process of (manual or automatic) scene change detection, a Scene Change Detection processing block 51 receives a current image to detect a scene change. A Camera Recognition module 52 is configured to (re-)identify cameras. Already known (e.g. previously identified) cameras are managed in an internal list 53.

According to one aspect of the invention, a user may define different user view settings for at least some of or each of the views. E.g. the user defines the first view in frames f1-f2 to be displayed e.g. in a 30% zoomed centered view. The user-defined settings for the first view corresponding to a first camera CAM#1 are stored, e.g. in a memory together with a list of detected cameras or separately. The camera CAM#1 may be implicitly assumed, or an identifier of the camera may be transmitted and received as metadata of the video stream. The camera recognition according to image analysis or according to a metadata identifier may be done in the Camera Recognition module 52. Note that the frames shown in FIG. 5 do not necessarily represent single video frames, but may also be understood as shots or scenes.

At the time t1, the input video switches to the second view in frames f3-f5. The scene change is detected by a Scene Change Detection module 51. The second view corresponds to a second camera CAM#2. The second camera CAM#2 may be implicitly assumed, or an identifier of the camera may be transmitted and received as metadata, as described above. The user defines the second view to be displayed e.g. in a 50% zoomed and 20% panned view. The user-defined settings for the second view corresponding to the second camera are also stored in the memory, like the user settings for the first view. At the time t2, the input video switches back to the first view in frame f6 (and following frames, not shown). The scene change is detected by the Scene Change Detection module 51. The Camera Recognition Module 52 detects that the view corresponds to the first camera CAM#1. The detection may be done e.g. by image analysis, recognizing a strong similarity between frames f1-2 and f6, or by using an identifier of the camera that may be transmitted and received as metadata. Various image features may be analyzed for detecting the similarity, such as contours, colors, motion, faces (through face recognition) etc.

After detecting that the view of frame f6 corresponds to the first view, the user-defined settings for the first view are retrieved from the storage and applied to the display. Thus, the user settings that were defined for the frames f1-f2 are automatically used also for the frame f6. The user may also use a downsampled full view, and modify the user-defined settings at any time.

In one embodiment, the user-defined settings relating to any particular user are valid only for a single current display. In a case where an input video is displayed simultaneously on two or more displays, separate user-defined settings can be applied for each of the displays. E.g. if a received video is sent from the STB to a user's high-resolution large screen display and simultaneously to the user's portable device display, a first set of user-defined settings is applied for the portable device and a different second set of user-defined settings is applied for the large screen. Both sets can be defined, stored and modified in the STB. An advantage is that the stream sent to the portable device may have a reduced data rate if only a part of the original image is displayed.

Figure 6:
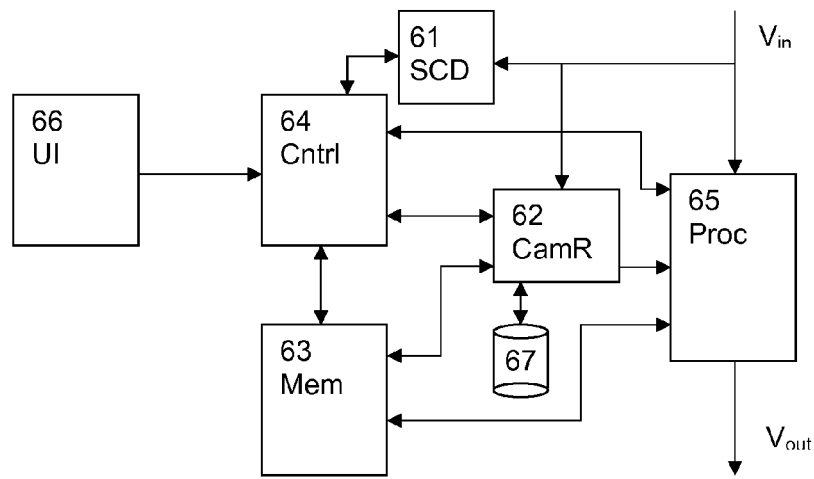

FIG. 6 shows the structure of an apparatus for displaying a video. It comprises a user interface module 66 (such as a keyboard, GUI, remote controller etc.) configured to enable a user to define first view settings, a first memory 63 configured to store the first view settings, a video image processor 65 configured to apply the first view settings to images of a first view of a first video scene, a camera recognition module 62 (such as a Camera Recognition module 52, a processor adapted by a suitable software, or a metadata extracting and interpreting unit) configured to detect a first camera corresponding to the first view, a Scene Change Detection module 61 (such as a Scene Change detection module 51, a processor adapted by a suitable software, or a metadata extracting and interpreting unit) configured to detect scene changes and to detect if a new scene after a scene change corresponds to the first view, and a controller 64 configured to retrieve the first view settings from the first memory and to control the video image processor to apply the first view settings for displaying the new scene if the new scene corresponds to the first view.

When a video stream $V_{in}$ enters the apparatus, the Camera Recognition module 62 determines a first view corresponding to a first camera, and (initially) the video image processor 65 provides the full view video at $V_{out}$ to a display or any subsequent processing (not shown). When a user selects first view settings through the user interface module 66, the controller 64 interprets the first view settings and controls the video image processor 65 to generate a view according to the first view settings. Further, the controller 64 associates the first view settings with the first view determined by the Camera Recognition module 62 and stores the view settings and their relation to the first view in the first memory 63. When the Scene Change Detection module 61 (which may also be an integrated part of the Camera Recognition module 62) detects that a new scene starts, the Camera Recognition module 62 in one embodiment compares the view of the new scene with previous views (whose characteristic parameters it may have stored, either in the first memory 63 or in a different memory 67). In another embodiment, the Camera Recognition module 62 receives metadata identifying the camera or view of the new scene. If the new scene uses a view for which view settings have been defined and stored previously, the view settings are retrieved from the memory 63 and provided to the video image processor 65 for processing the new scene accordingly. If the new scene uses a view for which no view settings have been defined and stored yet, the user may enter new view settings, or the video image processor 65 may use default view settings for the current display, or the video image processor 65 may skip processing the video and output the full view video at $V_{out}$. The user may select or modify view settings at least for the currently displayed view at any time through the user interface module 66. In one embodiment, the user may also select or modify view settings for other views than the currently displayed view, e.g. through a GUI.

Characteristic parameters suitable for comparing and recognizing views may be contours, colors, motion, faces (through face recognition) etc. Examples for contours are a horizon line, the shape of a soccer field, the shape of an object such as a house, or any background objects.

It is noted that the apparatus for displaying a video is suitable for performing the method according to the first embodiment as well as the method according to the other embodiments mentioned above.

It is also possible that proposed view settings are pre-generated in a studio for certain display types, which therefore may apply for a plurality of viewers. Such proposed view settings can be distributed as metadata within the video stream or attached to the video stream. The proposed view settings can also be distributed through other channels, such as the Internet. A user device extracts the metadata that it needs, i.e. that matches its display's capabilities. Also metadata indicating a scene change can be distributed as metadata within the video stream or attached to the video stream. In one embodiment, a metadata extraction module at the viewer's site (e.g. within a STB) extracts metadata that are within the video stream or attached to the video stream.

Figure 7:
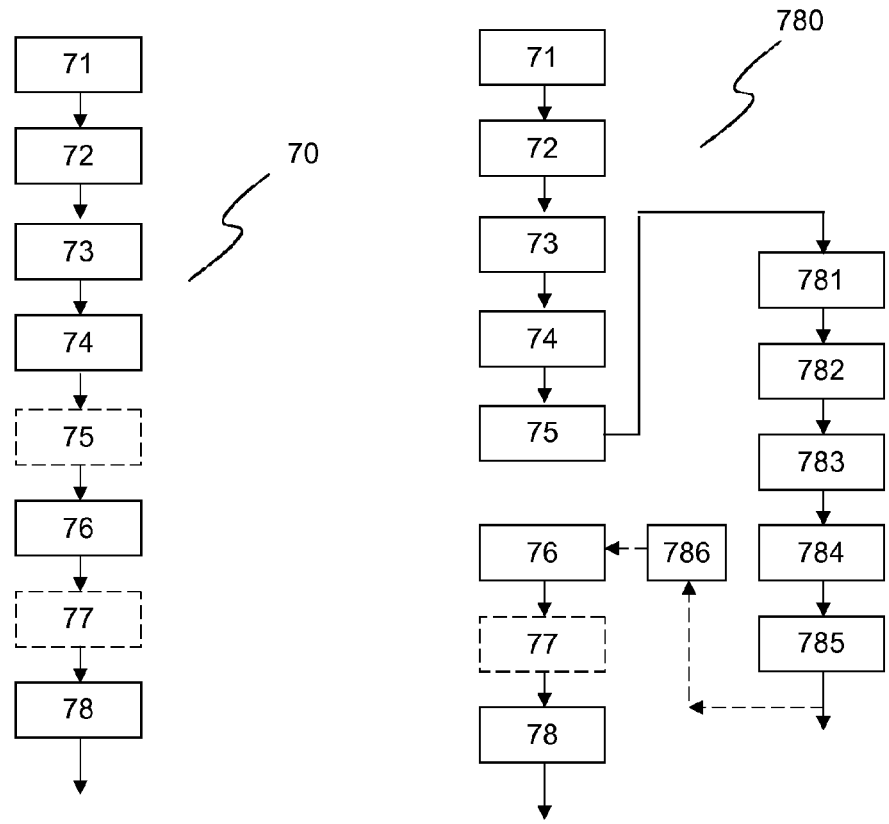

FIG. 7 a) shows a flow-chart of a method for displaying a video, or for preparing a video for being displayed. The method comprises steps of enabling a user to define 71 first view settings, applying 72 the first view settings to a first view of a first video scene, determining 73 a first camera corresponding to the first view, storing 74 the first view settings, after a scene change towards a new scene detecting 76 that the new scene corresponds to the first view, and automatically applying 78 the first view settings for displaying the new scene. An additional step 77 may be searching the first view settings in the storage where they were stored and retrieving them.

In one embodiment, the method further comprises a step of detecting 75 a scene change, wherein metadata are used that were received within the video or otherwise associated with the video (e.g. through a separate channel).

In one embodiment where the method further comprises a step of detecting 75 a scene change, the scene change is detected using image analysis.

FIG. 7 b) shows a flow-chart of a method for displaying a video, or for preparing a video for being displayed. The method comprises steps of enabling a user to define 71 first view settings, applying 72 the first view settings to a first view of a first video scene, determining 73 a first camera corresponding to the first view, and storing 74 the first view settings. In one embodiment, further steps are detecting 75 a first scene change, detecting 781 that the scene after the first scene change corresponds to a second view different from the first view, enabling a user to define 782 second view settings, applying 783 the second view settings to the second view of the second video scene, storing 784 the second view settings, and determining 785 a second camera corresponding to the second view.

In one embodiment, the method comprises further steps of detecting 786 a second scene change, detecting 76 that the scene after the second scene change corresponds to the first view, finding and retrieving 77 the stored first view settings, and automatically applying 78 the first view settings for displaying the scene after the second scene change.

One feature of the present invention is that the user can select an individual part of the enhanced (e.g. higher resolved) content to be shown on any particular (his or her) display device, or plurality of display devices. The view selection in the above description uses mainly the features pan, tilt and zoom for defining the individualized spatial part that is cropped and zoomed, based on parameters. However, other features that can in principle be regarded as "higher resolved", like HighDynamicRange, 3D, ColorGamut, may also benefit from this approach and thus may be used. E.g., a user may set 3D display parameters for a certain camera view different than for another camera view.

The above-mentioned metadata may be received inside the same stream like the video, e.g. like VideoText in unused parts of the image, or in the encoded digital stream, or as an extra stream e.g. in a hybrid approach (selling the metadata as extra stream via another transmission channel, such as broadcast and IP), or through other channels. If the metadata is received in the encoded digital stream, it may be embedded in the visible content of the first frame after each change, e.g. as special pixel pattern, e.g. black and white QR code, using a special detection pattern to identify frames with information. Only a small amount of information is required, e.g. 4 bit (i.e. 4 black and white pixels) for 16 cameras are sufficient. This will not be visible because the pixels will be shown only ⅕s s, or removed by any image correction. The metadata may also be embedded as a video watermark, or in the audio video stream as an audio watermark.

The above-mentioned scene detection can be done by extracting transmitted metadata providing an identifier of the current camera. If no transmitted metadata are available, an identifier of the current camera has to be estimated in the viewer's device (e.g. STB). The customers device creates a list of detected cameras. The camera list is maintained, and reset e.g. after a program change as detected from a tuner, decoder, remote control receiver or EPG. In one embodiment, a special "default/others" camera is used for assembling all views that cannot be identified. Scene cut detection tries to identify the point of change, and scene analysis is necessary to distinguish the multiple cameras. In one embodiment, the scene analysis uses a viewing angle or other visible information. In one embodiment, the scene analysis uses metadata e.g. to indicate scene changes and/or identify different cameras or views.

As described above, the invention provides a solution for the question what to use as new individual view after a camera change. In one embodiment, a semi-automatic view selection is used. In another embodiment, an individual view per camera is interactively defined.

In the semi-automatic view selection approach, the defined view (virtual user view) is reset at each scene cut: At the occurrence of a scene/camera change coming from the broadcast stream, the virtual user view will be moved to a default position. There are several default positions possible, for example:

reset to full view showing all available data, or reset to center with a default zoom 1×, cropping borders but showing highest possible resolution, or letting the user define selection of a variable point between the two variants (user defined standard zoom), e.g. via some profile.

It is also possible to provide more detailed information about a good starting position together with the metadata sent to identify the change. Therefore a default view description is sent together with the metadata. The metadata can describe at least one of a pan/tilt/zoom or crop/zoom virtual camera description, an area of interest describing an important rectangle/polygon/freeform of the image, etc. Multiple areas are possible and selectable by user profile or menu. Eventually this can lead to a complete guided viewing recommendation, in which a default view is sent for all images. Even multiple default views can be provided for selection by the viewer.

In the individualized view per camera approach, the individualized user view is stored for each camera if camera identifiers are available. The user starts to configure his or her individualized view for the current camera. When the camera changed, the user may individually modify also the new view. If the broadcast stream switches back to a previously used camera, the last configured user value is used. If multiple cameras are configured (but only one is visible at the moment), the user can select a mode to show the last image (and/or a typical image) of the other configured cameras using the picture-in-picture mode. In that view, it may be possible to configure all cameras, even those that are not visible at the moment.

In one embodiment, the method according to the invention is performed within a display device instead of a STB.

The principles of the present invention can be used e.g. during a migration phase from any commonly used (standard) television broadcasting format towards an advanced higher resolution format (including advanced temporal resolution). Generally, the principles of the present invention are particularly advantageous where a format or resolution of a received video stream provides format or resolution information that is beyond the capabilities of a display device. However, the principles of the present invention can also be used where a format or resolution of a received video stream match a format or resolution of a display device. In this case, at least individual view selection that works beyond scene changes is provided to the viewer.

While there has been shown, described, and pointed out fundamental novel features of the present invention as applied to preferred embodiments thereof, it will be understood that various omissions and substitutions and changes in the apparatus and method described, in the form and details of the devices disclosed, and in their operation, may be made by those skilled in the art without departing from the spirit of the present invention. Although the present invention has been disclosed with regard to video, one skilled in the art would recognize that the method and devices described herein may also be applied to any still picture display. It is expressly intended that all combinations of those elements that perform substantially the same function in substantially the same way to achieve the same results are within the scope of the invention. Substitutions of elements from one described embodiment to another are also fully intended and contemplated. It will be understood that the present invention has been described purely by way of example, and modifications of detail can be made without departing from the scope of the invention. Each feature disclosed in the description and (where appropriate) the claims and drawings may be provided independently or in any appropriate combination. Features may, where appropriate be implemented in hardware, software, or a combination of the two. Connections may, where applicable, be implemented as wireless connections or wired, not necessarily direct or dedicated, connections.

Reference numerals appearing in the claims are by way of illustration only and shall have no limiting effect on the scope of the claims.

The invention claimed is:

1. A method for modifying a video for display, comprising enabling a user to define individual first view settings, the first view settings comprising at least one of downsampling, zoom, tilt and pan, a different set of individual first view settings being defined for each display device of a plurality of display devices;

applying one of said set of individual first view settings to a first view of a first video scene according to which display device of said plurality of display devices is intended to display said first video scene, wherein at least one edge of the video is cropped in the first video scene;

determining a first camera corresponding to the first view, wherein the first camera is implicitly assumed according to image analysis of the first view, or wherein an identifier of the first camera is received as metadata within the video;

storing the first view settings;
after a scene change towards a new scene, detecting if the new scene is taken from a view that corresponds to the first view; and
upon detecting that the new scene is taken from a view that corresponds to the first view, applying one of said set of individual first view settings to display the new scene according to which display device of said plurality of display devices is intended to display said new scene.

2. Method according to claim 1, wherein said detecting that the new scene corresponds to the first view uses metadata, the metadata being received with the video or being associated with the video.

3. Method according to claim 1, further comprising detecting a scene change, wherein the scene change is detected by using metadata, the metadata indicating a scene change and being received with the video or being associated with the video.

4. Method according to claim 1, further comprising detecting a scene change, wherein the scene change is detected using image analysis.

5. Method according to claim 1, wherein the first view settings comprise a combination of zoom, tilt and pan.

6. Method according to claim 1, wherein the first view settings further comprise at least one of HighDynamicRange, 3D, and ColorGamut.

7. Method according to claim 1, wherein said scene change is a first scene change, further comprising
detecting that the new scene is taken from a view that corresponds to a second view different from the first view, wherein the second view is a view of a second camera different from the first camera;
enabling a user to define second view settings, the second view settings comprising at least one of downsampling, zoom, tilt and pan;
applying the second view settings to the second view of the second video scene;
storing the second view settings; and
determining said second camera corresponding to the second view, wherein the second camera is implicitly assumed according to image analysis of the second view, or wherein an identifier of the second camera is received as metadata within the video.

8. Method according to claim 7, further comprising detecting a second scene change;
detecting that the scene after the second scene change is taken from a view that corresponds to the first view;
retrieving the stored first view settings; and
automatically applying the first view settings for displaying the scene after the second scene change.

9. Method according to claim 7, wherein at least one of said detecting that the new scene after the first scene change is taken from a view that corresponds to a second view different from the first view and said detecting that the scene after the second scene change is taken from a view that corresponds to the first view uses metadata, the metadata being received with the video or being associated with the video.

10. An apparatus for modifying the display of a video, comprising
a user interface module configured to enable a user to define individual first view settings, the first view settings comprising at least one of downsampling, zoom, tilt and pan, a different set of individual first view settings being defined for each display device of a plurality of display devices;
first memory configured to store the first view settings;
video image processor configured to apply the one of said set of individual first view settings to images of a first view of a first video scene according to which display device of said plurality of display devices is intended to display said first video scene, wherein at least one edge of the video is cropped in the first video scene;
camera recognition module configured to detect a first camera corresponding to the first view, wherein the first camera is implicitly assumed according to image analysis of the first view, or wherein an identifier of the first camera is received as metadata within the video;
scene change detection module configured to detect scene changes, and configured to detect whether or not a new scene after a scene change is taken from a view that corresponds to the first view, and configured to provide the detected information whether or not said new scene after said scene change is taken from a view that corresponds to the first view;
controller configured to receive said detected information from the scene change detection module, and to retrieve the first view settings from the first memory and to control the video image processor to apply one of said set of individual first view settings for displaying the new scene if the new scene is taken from a view that corresponds to the first view according to which display device of said plurality of display devices is intended to display said new scene.

11. Apparatus according to claim 10, further comprising a metadata extraction module, wherein at least one of the following is based on using metadata: said detecting a scene change, said detecting that the new scene is taken from a view that corresponds to the first view in the scene change detection module, and determining for a new scene that the new scene is taken from a view that does not correspond to the first view.

12. Apparatus according to claim 11, wherein the metadata are received with the video or are associated with the video and extracted by the metadata extraction module.

13. Apparatus according to claim 11, wherein said metadata are received through a channel that is separate from the video, and said metadata are extracted by the metadata extraction module.

14. Apparatus according to claim 13, wherein said metadata are received through a stream separate from the video stream.

15. Apparatus according to claim 11, wherein said scene change detection module uses image analysis in an image analysis unit.

* * * * *